(12) United States Patent
Ullman et al.

(10) Patent No.: US 8,051,761 B1
(45) Date of Patent: Nov. 8, 2011

(54) SYSTEM AND METHODS FOR BROAD AREA VISUAL OBSCURATION

(75) Inventors: Alan Z. Ullman, Northridge, CA (US); Joel E. Anspach, Corrales, NM (US); Jeffrey J. Voelker, Butler, PA (US)

(73) Assignee: The Boeing Company, Chicago, IL (US)

( * ) Notice: Subject to any disclaimer, the term of this patent is extended or adjusted under 35 U.S.C. 154(b) by 1026 days.

(21) Appl. No.: 11/941,716

(22) Filed: Nov. 16, 2007

(51) Int. Cl.
| | |
|---|---|
| B64D 1/04 | (2006.01) |
| F41F 5/00 | (2006.01) |
| G02B 26/08 | (2006.01) |
| G02B 26/10 | (2006.01) |
| G02B 26/12 | (2006.01) |
| F21S 8/10 | (2006.01) |

(52) U.S. Cl. .................. 89/1.11; 359/196.1; 362/317
(58) Field of Classification Search .................. 89/1.11; 359/196.1; 362/317
See application file for complete search history.

(56) References Cited

U.S. PATENT DOCUMENTS

| 5,612,503 | A | * | 3/1997 | Sepp ........................... 89/1.11 |
| 5,837,918 | A | * | 11/1998 | Sepp ........................... 89/1.11 |
| 7,440,190 | B2 | * | 10/2008 | Ullman et al. ............... 359/629 |
| 7,483,454 | B2 | * | 1/2009 | Hauck et al. ................. 372/23 |
| 2006/0234191 | A1 | * | 10/2006 | Ludman ....................... 434/11 |
| 2008/0295677 | A1 | * | 12/2008 | Real et al. .................... 89/1.1 |

\* cited by examiner

Primary Examiner — Michael A Lyons
(74) Attorney, Agent, or Firm — Yee & Associates, P.C.

(57) ABSTRACT

A system and methods for broad area visual obscuration around a platform. In one embodiment the system comprises a source of visible light, shaping optics and projecting optics. The system projects a light beam onto an illumination area in a sweeping pattern to repetitively illuminate all portions of the illumination area, such that a stationary observer within the illumination area receives repeating pulses of the light at a power, intensity, frequency and duration sufficient to visually impair the observer so as to substantially prevent the observer from discerning the platform between pulses. The light pulses are capable of temporarily blinding human eyes but incapable of causing permanent vision loss.

20 Claims, 4 Drawing Sheets

SYSTEM AND METHODS FOR BROAD AREA VISUAL OBSCURATION

BACKGROUND

1. Technical Field

The present disclosure relates to reduction in visual acuity to prevent, for example, perception and/or targeting of platforms.

2. Description of Related Art

Aircraft flying low or landing in hostile or uncontrolled territory can be targeted by ground-based small arms fire. These weapons, such as machine guns and hand-held rocket launchers, rely on "point-and-shoot" targeting. The shooter sees the target, aims the weapon by aligning his or her eye with an expected trajectory of the projectile, and fires. Thus, the shooter must be able to see the target in order to aim accurately. Further, small arms are generally only accurate at close ranges, such as up to about one kilometer. Therefore, the shooter must be relatively close to the target in order to have a reasonable chance of hitting it.

Laser-based visual interrupters have been developed to temporarily blind individuals on the ground so that they cannot accurately discern the position of aircraft. These laser-based systems, however, emit narrow beams that are generally directed at individuals without the benefit of a stabilized pointing system.

SUMMARY

The embodiments of the present system and methods for broad area visual obscuration have several features, no single one of which is solely responsible for their desirable attributes. Without limiting the scope of the present embodiments as expressed by the claims that follow, their more prominent features will now be discussed briefly. After considering this discussion, and particularly after reading the section entitled "Detailed Description", one will understand how the features of the present embodiments provide advantages, which include the ability to temporarily reduce the visual acuity of any observer located within a broad area, such as an area within which small arms could effectively be used to target a platform but for the visual obscuration provided by the present system and methods.

One aspect of the present system and methods includes the realization that current laser-based visual interrupters are inadequate to cover large areas. They emit narrow beams that cannot prevent observation over an area large enough to prevent use of hand-held weapons against aircraft. Accordingly, a system and methods for obscuring vision over a large area would be of great benefit in protecting aircraft and other platforms.

One embodiment of the present system and methods for broad area visual obscuration comprises a source of visible light. Shaping optics are configured to shape the light into a beam having a desired shape. Projecting optics are configured to project the light beam onto an illumination area in a sweeping pattern to repetitively illuminate all portions of the illumination area. A stationary observer within the illumination area receives repeating pulses of the light at a wavelength, power, intensity, frequency and duration sufficient to visually impair the observer so as to substantially prevent the observer from discerning the platform between pulses. The light pulses are capable of temporarily reducing the visual acuity of human eyes but incapable of causing permanent vision loss or impairment.

Another embodiment of the present system and methods for broad area visual obscuration comprises producing visible light, shaping the light into a beam having a desired shape, and projecting the light beam onto the illumination area in a sweeping pattern to repetitively illuminate all portions of the illumination area. A stationary observer within the illumination area receives repeating pulses of the light at a wavelength, power, intensity, frequency and duration sufficient to visually impair the observer so as to substantially prevent the observer from discerning the platform between pulses. The light pulses are capable of temporarily reducing the visual acuity of human eyes but incapable of causing permanent vision loss or impairment.

The features, functions, and advantages of the present embodiments can be achieved independently in various embodiments, or may be combined in yet other embodiments.

BRIEF DESCRIPTION OF THE DRAWINGS

The embodiments of the present system and methods for broad area visual obscuration will now be discussed in detail with an emphasis on highlighting the advantageous features. These embodiments depict the novel and non-obvious system and methods shown in the accompanying drawings, which are for illustrative purposes only. These drawings include the following figures, in which like numerals indicate like parts.

DETAILED DESCRIPTION

Figure 1:
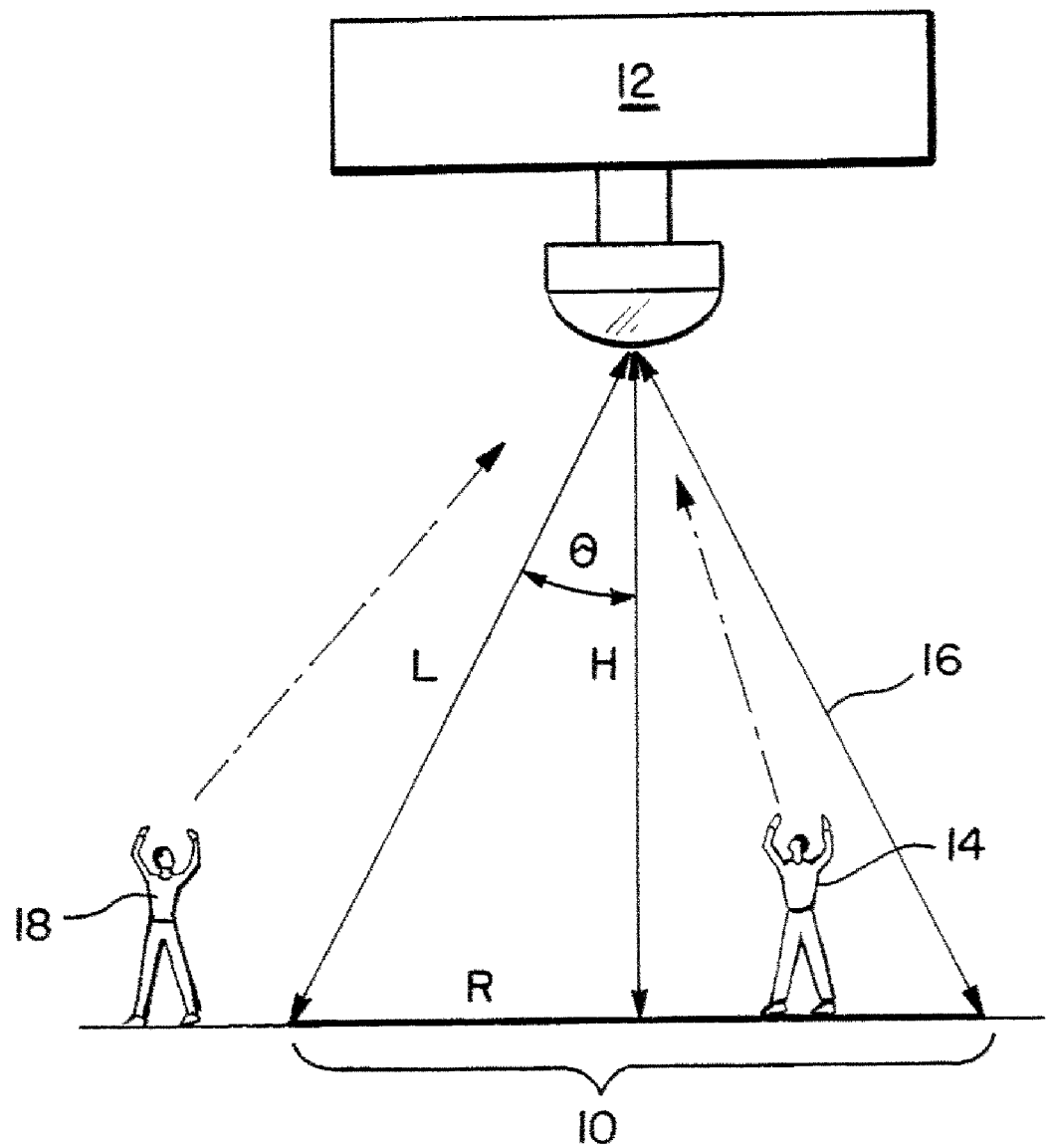
FIG. 1 is a schematic front elevation view of one embodiment of the present system and methods for broad area visual obscuration.

With reference to FIG. 1, the present embodiments are configured to project visible light in a sweeping pattern over a large illumination area 10 so as to render any observer within that area unable to see clearly a platform 12 from which the light emanates. To an observer 14 within the illumination area 10 the light arrives as repeated pulses. A wavelength, a power, an intensity, a duration and a repetition rate of each pulse are sufficient to prevent the observer's eyes from recovering enough visual acuity to discern the platform 12 clearly enough to target it or to obtain meaningful visual information about the platform 12. In the present disclosure the term platform is used broadly to encompass any apparatus, structure, area, etc. that it is desirable to obscure visually. In some embodiments the platform may comprise an aircraft, such as an airplane or a helicopter. In other embodiments the platform may comprise a ground-based vehicle or structure. In other embodiments the platform may comprise an undeveloped area, such as a portion of a battlefield. For example, the present embodiments may be used to obscure vision in an area through which troops are moving, so as to prevent observers from determining how many troops are present or in which direction they are heading.

In FIG. 1 the platform 12 is an aircraft. In this embodiment light is projected from the airborne platform 12 so as to relatively uniformly illuminate an illumination area 10 of radius R from the platform 12 at an altitude H. The light emanating from the platform 12 thus forms a circular cone 16 having a vertex angle of 2θ (two times theta) and sides of length L, where L equals $\sqrt{R^2+H^2}$. Thus, the range to the platform 12 from outside of the illumination area 10 is greater than L. In certain embodiments the value of L is selected to be large enough to neutralize any threats posed to the platform 12 by observers 18 located outside the illumination area 10, because the useful range of small arms that such observers 18 might use is less than L. And for observers 14 located inside the illumination area 10 the temporary blindness caused by the light projecting from the platform 12 similarly neutralizes any such threats.

Figure 2:
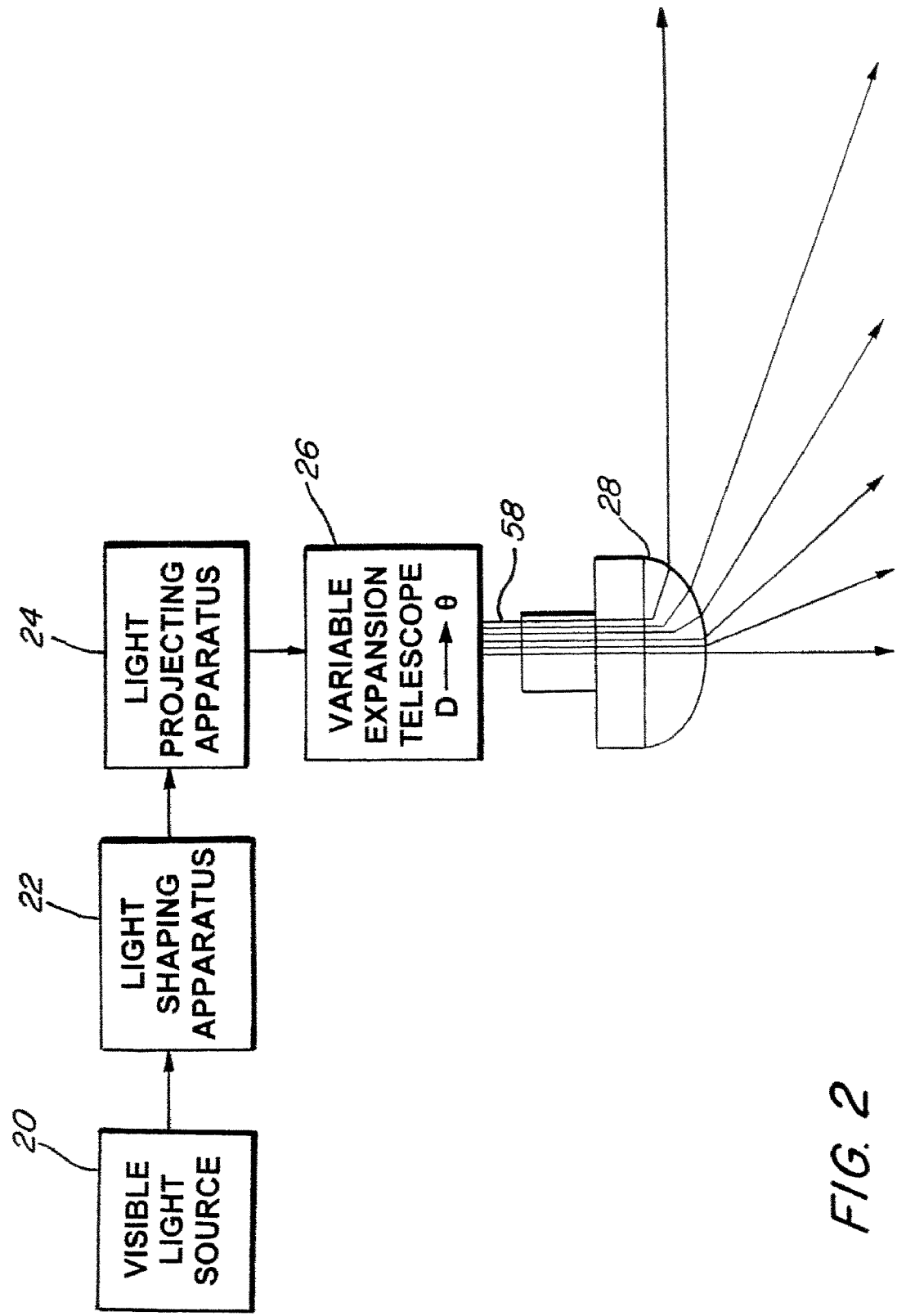
FIG. 2 is a combination block diagram and schematic front elevation view of another embodiment of the present system and methods for broad area visual obscuration.

With reference to FIG. 2, one embodiment of the present system comprises at least one source 20 of visible light. The source 20 may comprise, for example, one or more arc lamps or one or more laser diodes. The power and intensity of light emanating from the light source 20 is sufficient to generate pulses of light that are capable of temporarily the reducing visual acuity of human observers. This phenomenon is sometimes referred to as "flash blindness," and is a temporary condition. The power and intensity provided at the observer's location depends in part upon the distance between the observer and the light source 20, and suitable power and intensity levels for illuminating desired areas are described in further detail below.

With reference to FIG. 2, the illustrated embodiment of the present system further comprises a light shaping apparatus 22. Light emanating from the light source 20 may spread out over a wide area, as from an arc lamp, or it may be more focused, as from a laser diode. In either case, however, it is advantageous to shape the light into a focused beam having a desired shape in order to efficiently harness the power and intensity emanating from the light source 20. By efficiently harnessing this power and intensity a light source having lower power and/or intensity can be used to produce an output beam having the same power and/or intensity as light emanating from a source having greater power and/or intensity but no light shaping apparatus 22. The lower power and/or intensity light source may lower the cost of the overall system, and allow it to operate less expensively by consuming less power. The light beam produced by the light shaping apparatus 22 may have any shape, including substantially circular, substantially elliptical or substantially rectangular.

With reference to FIG. 2, the illustrated embodiment of the present system further comprises light projecting apparatus 24. The light projecting apparatus 24 is configured to control the characteristics of the light illuminating the illumination area 10 (FIG. 1). For example, the light projecting apparatus 24 may control the size of the illumination area 10 and/or the frequency and duration of a light pulse hitting a particular location within the illumination area 10. The light projecting apparatus 24 may include optics such as the mirrors illustrated in FIGS. 3-8, explained in further detail below. The light projecting apparatus 24 may further include a variable expansion telescope 26 and/or a fisheye lens 28 or equivalent optics. While these components are shown separately in FIG. 2, they may also be considered to be part of the light projecting apparatus 24. The telescope 26 and fisheye lens 28 are discussed in further detail below.

With reference to FIGS. 3-8, the light projecting optics 24 may include a plurality of mirrors. In the illustrated embodiment, the mirrors include a first substantially annular mirror 30, a second substantially annular mirror 32, a rotating mirror 34 and a substantially cone shaped mirror 36. A light beam 38 exiting the light shaping apparatus 22 impinges upon a reflective surface 40 of the rotating mirror 34. The reflective surface 40 is oriented at a desired angle to a path of travel of the light beam 38, such that a light beam 42 reflected from the rotating mirror 34 is directed to a reflective surface 44 of the first substantially annular mirror 30. The reflective surface 44 of the first annular mirror 30 is similarly oriented at a desired angle to direct a further light beam 46 reflected from the first annular mirror 30 along a desired path. In the illustrated embodiment, the path of travel for the beam 46 reflected from the first annular mirror 30 is parallel to the path of travel of the beam 38 exiting the light shaping apparatus 22. However, in other embodiments the paths of travel for the beams 38, 46 may not be parallel.

Figure 4:
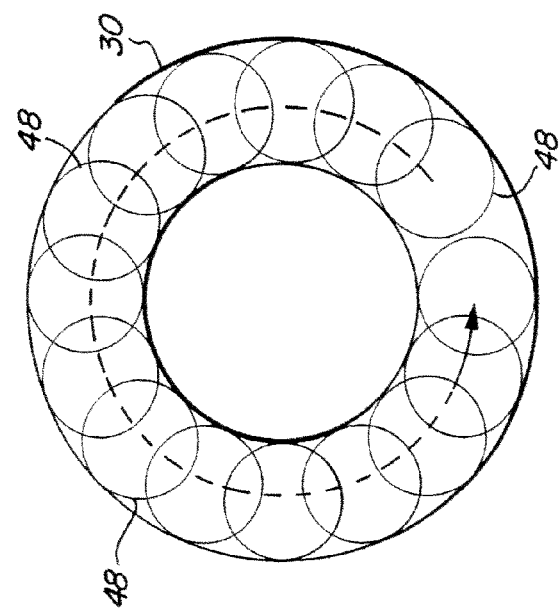
FIG. 4 is a schematic top plan view of an annular mirror of the light projecting apparatus of FIG. 3.
Figure 3:
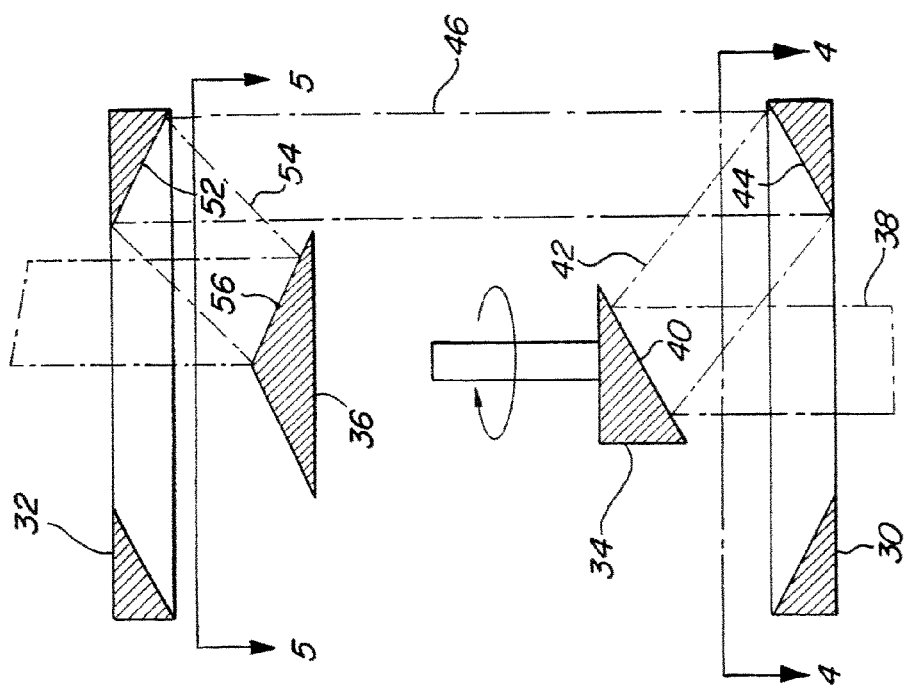
FIG. 3 is a schematic front elevation view of one embodiment of light projecting apparatus of the system and methods of FIG. 2.
Figure 7:
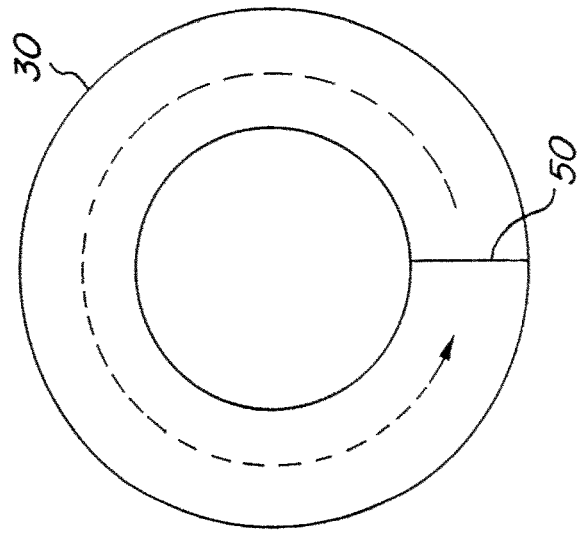
FIG. 7 is a schematic top plan view of an annular mirror of the light projecting apparatus of FIG. 6.
Figure 6:
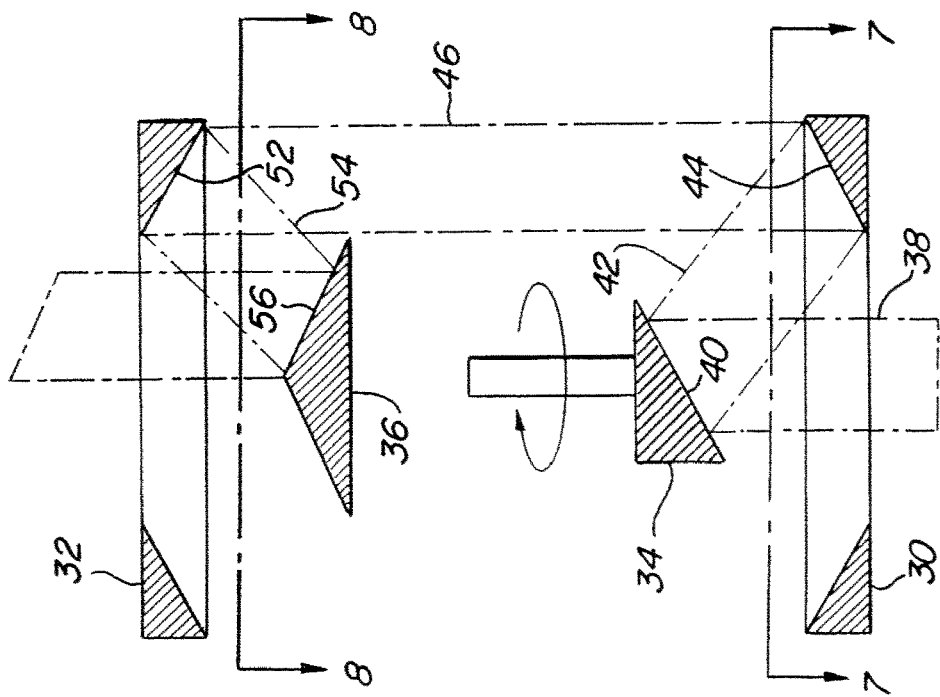
FIG. 6 is a schematic front elevation view of another embodiment of light projecting apparatus of the system and methods of FIG. 2.

As the rotating mirror 34 rotates, its angled reflective surface 40 directs the light beam 42 around the first annular mirror 30, as shown in FIGS. 4 and 7. In FIGS. 4 and 7 the beams 38 entering the light projecting optics emanate from the light shaping apparatus 22, which in FIG. 4 creates a substantially circular beam and in FIG. 7 creates a substantially rectangular or slit shaped beam. Further, the light shaping apparatus 22 receives pulses of light from the light source 20 at the pulse frequency of the light source 20. Thus, the light impinging upon the first annular mirror 30 over a given time interval appears as a series of circles 48 or bars 50 spread over the first annular mirror 30. For clarity only one bar 50 is shown in FIG. 7. The amount of overlap/spacing of the circles/bars 48, 50 can be controlled by either or both of adjusting the pulse frequency of the light source 20 or adjusting a rotational speed of the rotating mirror 34.

Figure 5:
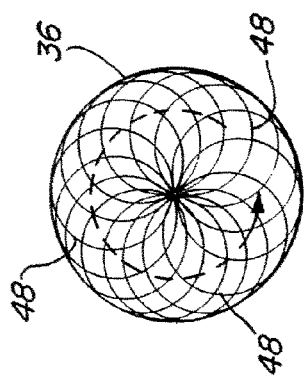
FIG. 5 is a schematic top plan view of a cone shaped mirror of the light projecting apparatus of FIG. 3.
Figure 8:
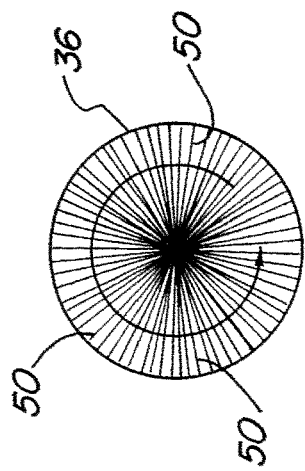
FIG. 8 is a schematic top plan view of a cone shaped mirror of the light projecting apparatus of FIG. 6.

The beam 46 reflected from the first annular mirror 30 similarly travels around a reflective surface 52 of the second substantially annular mirror 32. In the illustrated embodiment, the second annular mirror 32 is substantially identical to the first annular mirror 30 except for its opposite orientation. However, in other embodiments the first and second annular mirrors 30, 32 may differ from one another in certain respects, such as size and/or the angles of orientation of their reflective surfaces 44, 52. A beam 54 reflected from the second annular mirror 32 impinges upon a reflective surface 56 of the substantially cone shaped mirror 36. Again, the light emanating from the light source 20 is pulsed so that the light 54 impinging upon the cone shaped mirror 36 over a given time interval appears as a series of circles or bars 48, 50, as shown in FIGS. 5 and 8. However, since the radius of the cone shaped mirror 36 is less than the radius of the first annular mirror 30 the patterns of circles/bars 48, 50 spread over the cone shaped mirror 36 differs substantially from the patterns of circles/bars 48, 50 spread over the first annular mirror 30. In FIG. 5 the circles 48 overlap to a greater degree than the circles 50 in FIG. 4. While FIG. 7 illustrates only one bar 50, a time lapse illustration would show that the bars 50 in FIG. 8 are more closely spaced than those in FIG. 7. This variation in the pulse pattern on the differently sized mirrors 30, 32, 34, 36 illustrates how the light projecting optics 22 may be used to adjust a frequency of the light emanating from the source 20, up or down, to produce a desired pulse frequency emanating from the light projecting apparatus 24.

With reference to FIG. 2, the light projecting apparatus 24 again may include a variable expansion telescope 26 and a fisheye lens 28 or equivalent optics. The variable expansion telescope 26 limits a size, or diameter D, of the beam. In the present embodiments the term diameter is used broadly to indicate size, even in the case of non-circular beams. The diameter D of the beam influences the size of the illumination area 10. As explained above with respect to FIG. 1, in embodiments having a cone shaped illumination area 10, the fisheye lens 28 (or equivalent optics) spreads the beam out over a cone 16 having a vertex angle of 2θ. The value of θ can be adjusted by shrinking or enlarging the diameter of the beam 58 that hits the inside of the fisheye lens 28. A wider beam 58 will produce a larger value of θ, and a narrower beam 58 will produce a smaller value of θ. The variable expansion telescope 26 provides this adjustability for the beam diameter.

As outlined above, the present embodiments use at least one source 20 of visible light to generate intense light that can be directed to a selectable area at a desired repetition rate and intensity so as to render anyone within that area unable to see the source platform 12 clearly enough to target or obtain visual information about the platform 12. In order to prevent an observer 14 from visually inspecting or targeting the platform 12, it is desirable to irradiate the eyes of the observer 14 at a level of about 40 microwatts/cm$^2$ at a wavelength of between about 530 nanometers and about 555 nanometers about every 1 to 10 seconds for a duration of about 10 milliseconds, with the duration and magnitude of irradiation varying in accordance with the source wavelength to achieve the same desired effect. Exposure to light of this magnitude causes the retinas of the observer's eyes to "bleach" and lose the ability to distinguish images or target features. At 555 nm, this irradiation level is typically less than 5% of the level at which permanent damage is done to the eye, thus providing a large safety margin. Of course, in alternative embodiments the irradiance level, repetition rate and/or duration of the light pulse may need to be adjusted upward or downward. For example, the irradiance may vary from about 20 μW/cm$^2$ to about 800 μW/cm$^2$, and may be even higher or lower. Further, the values of these variables may be determined by ambient light levels (e.g., day or night conditions) and available scene contrast. During daylight hours or under high contrast conditions, more light may be needed to produce the desired effects.

In embodiments where it is desired to provide retinal bleaching up to ranges of approximately 1 km, many currently available light sources may be used. For example, typically it is only necessary to illuminate an individual for 0.1% of the time at the 40 microwatt/cm$^2$ intensity cited above. For a zone 1 km in radius, these parameters correspond to an average power level of 1250 watts. Commercially available xenon arc lamps produce this power level at a pulse length of 10 milliseconds and a repetition frequency of 100 Hz. The matching of this lamp output to the geometry shown in FIGS. 3-8 is straightforward. Similarly, single laser diodes in the 25 W range are readily available at visible wavelengths (e.g., 660 nm). However, at 660 nm the eye is some 20 times less sensitive to light than at 555 nm and consequently will require an irradiance of 20 time that of a 555 nm source or about 800 microwatt/cm$^2$. Therefore, creating an array of about 1000 such laser diodes creates the input required for the optics illustrated in FIGS. 6-8.

Pulsed light sources generally have higher repetition rates under conditions of high efficiency. Therefore, in embodiments including such light sources the light shaping apparatus 22 may contain optics to allow the individual pulses to be restricted to a smaller fraction of the output area and for revisiting to occur at the required rate. The mirrors 30, 32, 34, 36 illustrated in FIGS. 3-8 provide examples of such optics.

In embodiments in which the light source 20 is a high-power laser diode, the light source 20 may be operated in a continuous wave (CW) manner to allow maximum power to be extracted from each laser diode. In such embodiments the light projecting apparatus 24 of FIGS. 6-8 may be used to convert the bar shaped laser diode output into a highly elongated frustum that subtends a fraction of the annular mirror 30 approximately equal to the desired duty factor of pupillary irradiance on an observer.

As the angle θ of the light beam changes, the illumination area 10 (FIG. 1) on the ground changes. Thus, the amount of light required to produce the desired bleaching effect may need to be adjusted so as to produce the desired effect without danger of reaching an intensity level that could cause permanent damage to the eyes of the observers.

The above description presents the best mode contemplated for carrying out the present system and methods for broad area visual obscuration, and of the manner and process of making and using them, in such full, clear, concise, and exact terms as to enable any person skilled in the art to which they pertain to make this system and use these methods. This system and these methods are, however, susceptible to modifications and alternate constructions from those discussed above that are fully equivalent. Consequently, this system and these methods are not limited to the particular embodiments disclosed. On the contrary, this system and these methods cover all modifications and alternate constructions coming within the spirit and scope of the system and methods as generally expressed by the following claims, which particularly point out and distinctly claim the subject matter of the system and methods.

What is claimed is:

1. A system for broad area visual obscuration around a platform, comprising:
   a source of visible light;
   shaping optics configured to shape the light into a beam having a desired shape; and
   projecting optics configured to project the light beam onto an illumination area in a sweeping pattern to repetitively illuminate all portions of the illumination area, such that a stationary observer within the illumination area receives repeating pulses of the light at a wavelength, power, intensity, frequency and duration sufficient to visually impair the observer so as to substantially prevent the observer from discerning the platform between pulses;
   wherein the light pulses are capable of temporarily reducing the visual acuity of human eyes but incapable of causing permanent vision loss or impairment.

2. The system of claim 1, wherein the pulse frequency is between about 1 pulse per second and about one pulse every 10 seconds.

3. The system of claim 1, wherein the system is configured to illuminate the eyes of the observer with an irradiance of between about 20 μW/cm$^2$ and about 800 μW/cm$^2$.

4. The system of claim 1, wherein the pulse duration is between about 5 ms and about 15 ms.

5. The system of claim 1, wherein the projecting optics comprise a rotating mirror.

6. The system of claim 1, wherein the projecting optics comprise an annular mirror.

7. The system of claim 1, wherein the projecting optics comprise a fisheye lens.

8. The system of claim 1, wherein the illumination area is shaped as a circular cone.

9. The system of claim 1, wherein the system is configured to adjust a size of the illumination area.

10. The system of claim 9, further comprising a variable expansion telescope configured to adjust the size of the illumination area.

11. The system of claim 1, wherein the source of visible light comprises a source of radiation between about 380 nm and about 750 nm.

12. The system of claim 11, wherein the source of visible light comprises an arc lamp or a laser diode operating in a continuous wave mode.

13. The system of claim 12, wherein the shaping optics are configured to shape an output of the laser diode into an elongated frustum.

14. The system of claim 1, wherein the power of the light is adjustable.

15. A method of illuminating an illumination area in a vicinity of a platform so as to temporarily blind an observer within the illumination area, the method comprising the steps of:
   producing visible light;
   shaping the light into a beam having a desired shape; and
   projecting the light beam onto the illumination area in a sweeping pattern to repetitively illuminate all portions of the illumination area, such that a stationary observer within the illumination area receives repeating pulses of the light at a wavelength, power, intensity, frequency and duration sufficient to visually impair the observer so as to substantially prevent the observer from discerning the platform between pulses;
   wherein the light pulses are capable of temporarily reducing the visual acuity of human eyes but incapable of causing permanent vision loss.

16. The method of claim 15, wherein the pulse frequency is between about 1 pulse per second and about one pulse every 10 seconds.

17. The method of claim 15, wherein the system is configured to illuminate the eyes of the observer with an irradiance of between about 20 $\mu W/cm^2$ and about 800 $\mu W/cm^2$.

18. The method of claim 15, wherein the pulse duration is between about 5 ms and 15 ms.

19. The method of claim 15, wherein the platform is airborne.

20. The method of claim 15, wherein the illumination area is shaped as a circular cone.

* * * * *